United States Patent Office 2,929,839
Patented Mar. 22, 1960

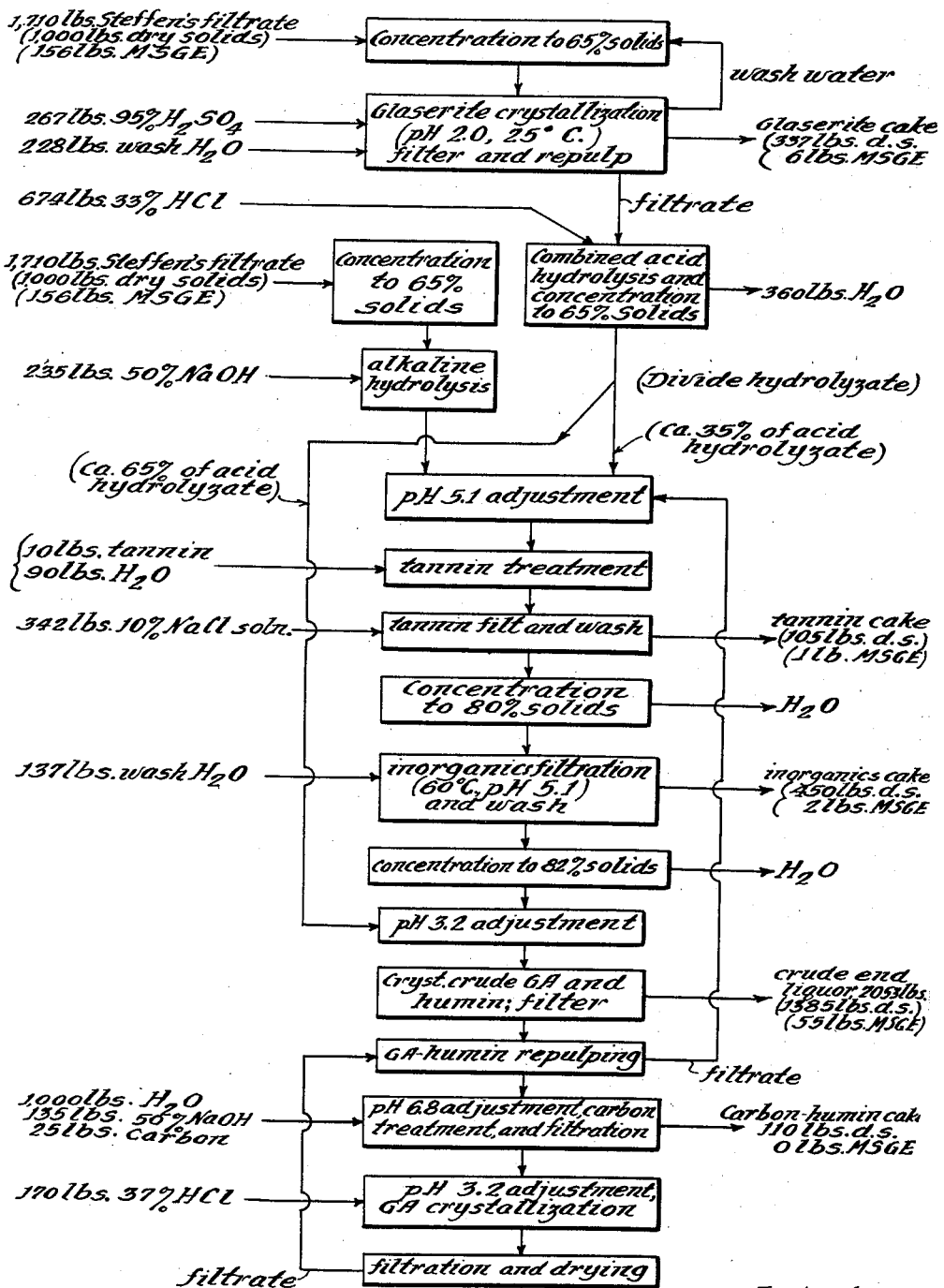

2,929,839

PROCESS FOR RECOVERING GLUTAMIC ACID

Forest A. Hoglan, Glenview, Ill., assignor to International Minerals & Chemical Corporation, a corporation of New York Application November 29, 1956, Serial No. 625,037

3 Claims. (Cl. 260—527)

This invention relates to an improved method for the production of glutamic acid, and more particularly to an improved co-neutralization process for the recovery of glutamic acid values from beet sugar waste liquors.

Glutamic acid does not occur as the free acid in nature, but in various combined or derivative forms, such as glutamine, proteins, pyrrolidonecarboxylic acid, and the like, from which it can be liberated or reconstituted by known means. It is common practice, for example, to subject glutamic acid mother substances to hydrolysis under acid or alkaline conditions to form a salt of the free acid, and to recover the glutamic acid from the resulting hydrolyzate. It is well known that acid hydrolysis simultaneously produces a considerable quantity of humin or humin-like materials, which complicate the recovery of glutamic acid from the hydrolyzate. It has heretofore been customary to separate the humin substances from the acid hydrolyzate before crystallizing glutamic acid therefrom. This is done, for example, by directly filtering the acid hydrolyzate, which is a difficult operation owing to the highly acidic nature of the material. In another technique, the acid hydrolyzate is alkalized to pH 4 to 6 and treated with tannin to remove humin along with other organic impurities. In this technique, it is necessary to add alkali to permit evaporation under non-corrosive conditions, and then to reacidify to pH 3.2 to permit crystallization of glutamic acid, thus greatly increasing the reagent costs.

Some years ago it was proposed to reduce the reagent costs by utilizing a "co-neutralization" process, involving both alkaline and acid hydrolysis of separate portions of the starting material, followed by appropriate commingling of the hydrolyzates to effect pH adjustment as desired. In this technique, a portion of the acid hydrolyzate was filtered and the clear, humin-free filtrate was used for the second acidification, to pH 3.2, just prior to crystallizing glutamic acid. The remainder of the acid hydrolyzate, together with the humin filter cake, was used for the initial pH adjustment of the alkaline hydrolyzate to the range of 4 to 6, at which point tannin treatment was employed to remove the humin.

My invention is an improvement in the co-neutralization technique for recovering glutamic acid from beet sugar waste liquors, by means of which the filtration of acid hydrolyzate to remove humin is completely avoided. I have observed that the crystallization of crude glutamic acid at its isoelectric point, pH 3.2, is not materially hindered by the presence of humin or humin-like substances in the crystallization mixture. I have further observed that the crude glutamic acid-humin mixture can be satisfactorily washed with an aqueous saline solution. I have discovered that the glutamic acid and humin can then be separated by dissolving the glutamic acid in water under either neutral or highly acidic conditions and removing the humin by filtration, centrifugation, or the like. I have further discovered that such separation is greatly facilitated by adding an activated carbon to the crude mixture. By virtue of these discoveries, I find it possible to employ acid hydrolyzate for co-neutralizing alkaline hydrolyzate without filtering any part of the acid hydrolyzate prior thereto.

An object of this invention is to provide a new and improved method for the recovery of glutamic acid from Steffen's filtrate, barium filtrate, vinasse, schlempe, and other beet sugar waste and fermentation liquors.

Another object is to recover glutamic acid from such sources while minimizing corrosion problems.

Another object is to simplify the separation of humin substances from glutamic acid.

Another object is to provide a new and improved co-neutralization process which avoids the shortcomings of the prior-art co-neutralization processes.

These and other objects of the invention will be apparent from the following description and claims.

In a preferred embodiment, my invention comprises a co-neutralization process wherein alkaline hydrolyzate and unfiltered acid hydrolyzate are combined in a proportion to reach a pH between 4 and about 6, the combined hydrolyzates are concentrated to remove inorganic salts, adjusted to a pH between about 2.5 and about 3.5 with a further quantity of unfiltered acid hydrolyzate, and subjected to crystallization to remove a crude glutamic acid-humin mixture. The crude mixture is washed with a saline solution, then slurried with water and adjusted to a pH between about 6 and about 8 with sodium hydroxide or other alkali-metal hydroxide. Under these conditions, the glutamic acid readily dissolves as monosodium sodium glutamate and a saline mixture is generated in situ, which further conditions the humin and permits it to be readily separated therefrom by filtration. I prefer to add decolorizing carbon to the slurry prior to filtration in order to improve the filtration rate and to remove color bodies from the liquid phase. The purified solution is then acidified to pH 2.5–3.5, preferably about pH 3.2, and glutamic acid is crystallized therefrom in substantially pure form.

Alternatively, the washed crude glutamic acid-humin mixture can be slurried with a strong mineral acid such as hydrochloric acid or sulfuric acid to a pH between about 0 and about 1. Under these conditions, the glutamic acid readily dissolves as a salt of the acid employed, and saline mixture is generated in situ, which conditions the humin and permits it to be readily separated therefrom by filtration. In this case also, I prefer to add decolorizing carbon to the slurry prior to filtration. The filtrate is adjusted to around pH 3.2 with any suitable alkali, and purified glutamic acid is crystallized therefrom.

In the acid hydrolysis phase of my invention, the starting material (such as Steffen's filtrate) is commingled with sulfuric acid, hydrochloric acid, or other non-oxidizing mineral acid (i.e., a mineral acid which is non-oxidizing under the conditions employed for the hydrolysis) in a quantity sufficient to produce a pH below about 1.0, preferably about 0. The acidified mixture is heated to a temperature between about 100 and about 125° C. for a period of about one-quarter to about 4 hours, preferably about 2 hours. Hydrolysis of the glutamic acid mother substances is substantially complete under these conditions.

In treating Steffen's filtrate, barium filtrate, vinasse, schlempe, and similar stocks, it is advantageous (although not necessary) to carry out a preliminary treatment, prior to acid hydrolysis, to remove inorganic salts and optionally to remove betaine therefrom; and it is preferred that such stocks be subjected to a preliminary concentration to a specific gravity between about 1.2 and about 1.4, corresponding to a solids content between about 60 and about 70% by weight. Inorganic salts can conveniently be removed by acidifying the concentrated liquor to a pH between about 1.5 and about 2.5, preferably around 2.0, as a result of which potassium values therein are ordinarily precipitated in the form of glaserite $$(Na_2SO_4 \cdot 3K_2SO_4)$$

and can be removed by filtration, centrifugation, or the like. Betaine can thereafter be crystallized from the liquor in the form of the hydrochloride by adding concentrated hydrochloric acid to a pH around 0.6. The betaine need not, however, be removed unless desired, since it does not seriously interfere with the recovery of glutamic acid, and since it is a useful and valuable constituent of the end liquor when allowed to remain in the process stream.

In the alkaline hydrolysis, Steffen's filtrate (or other starting material) is concentrated, if necessary, to about 65% solids, alkalized to pH 13 or higher with sodium hydroxide, potassium hydroxide, or other alkali, and hydrolyzed under conventional conditions. Ordinarily less than about 10% by weight (e.g., 4 to 8%) of alkali is employed, and the hydrolysis is completed at 60 to 100° C. in 1 to 4 hours (e.g., 2¼ hours at 85° C.).

In the first co-neutralization of my process, the alkaline hydrolyzate is commingled with a sufficient quantity of unfiltered acid hydrolyzate to reach a pH between about 4 and about 6, preferably between about 4.5 and about 5.5. For this purpose, between about 20 and about 70% by volume of acid hydrolyzate is required, ordinarily between about 30 and about 60%, based on the volume of alkaline hydrolyzate, depending in any given case upon the concentrations of alkali and acid in the respective hydrolyzates. The resulting slurry is optionally treated with between about 0.2 and about 4% by weight of tannin, based on dry solids in the total starting material, a dilute aqueous solution of tannin being preferably employed. Organic impurities, including humin substances, are removed thereby from the aqueous phase, and are withdrawn in the resulting tannin cake. The purified liquid is concentrated to between about 70 and about 90% by weight of dry solids, varying inversely as the solids content of the acid hydrolyzate which is to be used in the second co-neutralization. (When, for example, the acid hydrolyzate contains 65% solids, whether such concentration was reached by evaporation during hydrolysis or otherwise, the concentration of the co-neutralized alkaline hydrolyzate can be as low as 80% solids.) The resulting precipitate, comprising principally inorganic salts, is separated at a temperature of 60° C. or above, a continuous solid-bowl centrifuge being conveniently employed for this purpose. The partially desalted liquor is thereafter co-neutralized to a pH between about 2.5 and about 3.5, preferably around 3.2, with a sufficient quantity of unfiltered acid hydrolyzate. For this purpose, between about 50 and about 75% by volume of acid hydrolyzate, based on the alkaline hydrolyzate originally employed, is ordinarily adequate. The co-neutralized material is sufficiently high in concentration to permit effective crystallization of glutamic acid therefrom, which is carried out by cooling, seeding if desired, and holding at ordinary or somewhat reduced temperature for 1 to 5 days or longer until crystal growth has substantially ceased. The crude glutamic acid, containing humin substances and other impurities, is separated from the crystallization slurry by centrifugation, filtration, or the like.

The crude glutamic acid-humin mixture cannot satisfactorily be washed with water alone, inasmuch as such treatment tends to disperse and gelatinize the humin materials, as a result of which filtration becomes very difficult or impossible. Moreover, the subsequent handling of the material becomes difficult owing to the presence therein of the resultant gummy organic solids. I have found that the crude mixture can be satisfactorily washed with an aqueous saline solution, such as a solution of sodium chloride, sodium sulfate, or the like. The proportion of dissolved salt in the wash solution should be at least about 2% by weight, preferably at least about 5% by weight, and may range upward to the saturation level. The salt employed may be substantially any inert electrolyte—i.e., a soluble, ionizable salt which does not undergo chemical reaction with the constituents of the glutamic acid-humin mixture. Only a small proportion of the salt is ordinarily retained in the solid material, and such small proportion is in any event readily separated from the glutamic acid in the subsequent processing steps. An especially convenient and advantageous wash liquor is the mother liquor obtained later in the process from the final crystallization of purified glutamic acid. This liquor ordinarily contains, in addition to glutamic acid, a substantial proportion of sodium chloride or sodium sulfate, and is largely free of undesired impurities. It is thus satisfactory as a washing medium for the crude glutamic acid-humin cake.

In a preferred embodiment of my invention, the washed crude glutamic acid cake is slurried in water and adjusted in pH to about 7 by adding a sufficient quantity of sodium hydroxide, an aqueous solution of monosodium glutamate being obtained thereby. The solution is then treated with an activated carbon in a proportion between 0.1 and about 1 pound of carbon per pound of dry humin solids contained therein. Higher proportions of carbon within or above this range may be employed if desired, especially in conjunction with solutions of abnormally dark color. The mixture is stirred at elevated temperature for a short while, suitably at a temperature between about 50 and about 100° C. for about 0.1 to 1 hour or more, and is then filtered. The carbon removes substantially all of the humin-like material, together with a high proportion of other organic contaminants and color bodies. The purified solution is acidified to pH 3.2 with hydrochloric acid, sulfuric acid, or the like, and glutamic acid of 95% purity or higher crystallizes rapidly therefrom.

My invention will be more fully understood from the following detailed embodiment thereof, to be read in conjunction with the attached drawing.

Steffen's filtrate or other filtrate produced by the barium or calcium treatment of beet sugar molasses (1,710 pounds total weight, containing 1,000 pounds total dry solids comprising 156 pounds of glutamic acid values calculated as monosodium glutamate, hereinafter referred to as "monosodium glutamate equivalent" or "MSGE") is concentrated to a specific gravity between about 1.2 and about 1.4, preferably about 65% solids by weight. Sulfuric acid (267 pounds of 95% $H_2SO_4$) is added to give a pH between about 1.5 and about 2.5, preferably about 2.0. Acid of lower concentration can be used, but is preferably avoided since it would cause undesirable dilution. The temperature is preferably held below about 70° C. during addition of the acid in order to minimize hydrolysis of glutamic acid precursors at this point, with consequent loss of glutamic acid values with the inorganic salts precipitated by the acid. The acidified filtrate is cooled to a temperature between about 0 and about 50° C., e.g., 25° C., and inorganic sulfate salts (337 pounds of dry solids, 6 pounds MSGE) comprising predominantly glaserite ($Na_2SO_4 \cdot 3K_2SO_4$) are crystallized and separated therefrom. This separation of salts is conveniently carried out by use of a filter press, basket centrifuge, or the like. The salts are washed with 228 pounds of water, and the washings are channeled to incoming filtrate.

The salt-depleted filtrate is then hydrolyzed under acid conditions. Concentrated hydrochloric acid (674 pounds of 33% HCl) is added to a pH below about 0.6, and the mixture is heated at a temperature between about 100 and about 125° C. for about one-quarter to about 4 hours, e.g., about 2 hours. In a preferred embodiment of my invention, the hydrolysis mixture is simultaneously concentrated by distilling off water (360 pounds) to bring the solids concentration to the desired level, e.g., at least about 65% by weight. The resulting hydrolyzate is divided into two streams, one of which is used for co-neutralization of alkaline hydrolyzate, described below, while the other is used later in the process for pH adjustment prior to the glutamic acid crystallization step.

An equal quantity of the starting filtrate (1,710 pounds total weight, containing 1,000 pounds total dry solids comprising 156 pounds MSGE) is subjected to alkaline hydrolysis. For this purpose 235 pounds of aqueous 50% sodium hydroxide solution are added thereto to produce a pH of about 13 or higher, and the mixture is heated to a temperature between about 75 and about 100° C. for a period of about one-half to about 4 hours, preferably around 85° C. for about 2¼ hours. The alkaline hydrolyzate is then cooled and combined with a sufficient quantity (e.g., about 35%) of the acid hydrolyzate to reach a pH between about 4 and about 6, preferably between about 4.5 and 5.5, optimally around 5.1. Impurities are removed therefrom by treatment with 100 pounds of aqueous 10% tannin solution. The resulting humin-tannin cake is filtered off, washed with 342 pounds of aqueous 10% sodium chloride solution, and discarded. The cake generally contains about 105 pounds of dry solids, comprising one pound of MSGE.

The purified liquid is next subjected to concentration to approximately 80% solids content. During this operation a large proportion of the inorganic materials contained therein are precipitated. These materials are filtered off at about 60° C., washed with 137 pounds of water, and rejected. The cake contains about 450 pounds of dry solids, including 2 pounds of MSGE. The filtrate is further concentrated to about 82% dry solids content, then adjusted to pH 3.2 by addition of a further quantity (e.g., about 65%) of the acid hydrolyzate. The adjusted solution is cooled to a temperature between about 0 and about 30° C., seeded if desired with a small quantity of glutamic acid crystals, and allowed to stand with gentle stirring for about 5 days to allow crystallization of glutamic acid to reach substantial completion. The crystallization slurry is then subjected to filtration, yielding a crude glutamic acid cake and a crude end liquor, the latter weighing 2,053 pounds and containing 1,385 pounds of dry solids, including 55 pounds of MSGE.

The crude glutamic acid cake, which includes the humin contained in the second portion of acid hydrolyzate, is washed by repulping with an aqueous glutamic acid crystallization liquor obtained in a previous batch from a later step in the process, then filtering, and recycling the filtrate to the pH 4–6 co-neutralization step of a succeeding batch.

The washed glutamic acid-humin cake is slurried in a mixture of 1,000 pounds of water and 135 pounds of aqueous 50% sodium hydroxide solution to reach pH 6.8. To the resulting humin-containing solution of monosodium glutamate are added 25 pounds of activated carbon, and the mixture is stirred at about 60° C. for a short while, suitably about one-half hour, after which the mixture is filtered. With the filter cake is removed substantially all of the humin, and a considerable improvement in color of the solution is also achieved thereby. The carbon-humin cake contains 110 pounds of dry solids and is substantially free from MSGE. The purified solution is adjusted to pH 3.2 by adding 170 pounds of 37% hydrochloric acid, and purified glutamic acid crystallizes rapidly therefrom at ordinary or somewhat reduced temperatures in about 24 hours or less. The glutamic acid is filtered off, washed with 85 pounds of water, and dried. The filtrate and washings are employed to wash the crude glutamic acid-humin cake from the initial crystallization step of a succeeding batch. The end product of the process is 202 pounds of glutamic acid having a purity of 97% or more, equivalent to 251 pounds of monosodium glutamate.

The following specific example will more clearly illustrate my invention. All quantities are in parts or percentages by weight unless otherwise indicated.

*Example*

*Alkaline hydrolysis.*—1,000 parts of concentrated Steffen's filtrate containing 586 parts of solids were concentrated under reduced pressure to 903 parts, containing 65% solids. To the concentrate were added 137 parts of aqueous 50% sodium hydroxide solution with stirring, and the mixture was heated rapidly to 85° C. and held at this temperature for 2¼ hours. The resulting hydrolyzate was cooled rapidly to approximately 30° C.

*Glaserite removal.*—A mixture of 3,000 parts of concentrated Steffen's filtrate and 490 parts of glaserite wash water from a preceding cycle was concentrated under reduced pressure to 3,000 parts (65% solids). The concentrate was adjusted to pH 2.0 by adding 480 parts of 96% sulfuric acid, the temperature being held below 50° C. during this procedure. The acidified concentrate was allowed to stand overnight, and the precipitate of glaserite ($Na_2SO_4 \cdot 3K_2SO_4$) which formed during this time was removed by filtration. The glaserite cake was washed with 500 parts of water, and the wash liquor was collected and reserved for return to a subsequent cycle.

*Acid hydrolysis.*—The glaserite filtrate (2,530 parts) was acidified with 1,182 parts of 33% hydrochloric acid. The acidified liquid was boiled under reflux for 1½ hours, then boiled 1½ hours with total takeoff of distillate until about 550 parts of water had been removed. The concentrated hydrolyzate weighed 3,200 parts.

*First co-neutralization.*—The alkaline hydrolyzate was combined with the crude GA repulp water (defined below) from a previous cycle and adjusted to pH 5.1 by adding 397 parts of unfiltered acid hydrolyzate (containing a quantity of insoluble humin). To the mixture were added 80 parts of aqueous 10% tannin solution, and the resulting tannin-humin cake was filtered off and washed with 200 parts of aqueous 10% sodium chloride solution. The filtrate and wash liquor were combined, concentrated under reduced pressure to 1,500 parts, and allowed to stand overnight. Inorganic solids comprising largely sodium chloride crystallized during this time, and were filtered off and washed with 150 parts of water.

*Second co-neutralization.*—The filtrate and wash liquor were combined, reconcentrated to 1,090 parts, and adjusted to pH 3.2 with 648 parts of the unfiltered acid hydrolyzate. The adjusted concentrate was allowed to stand for 5 days, during which time glutamic acid crystallized from solution. The resulting slurry, containing glutamic acid heavily contaminated with humin, was filtered. The filtrate, ordinarily referred to as "glutamic acid end liquor," was withdrawn for further treatment not connected with the present invention for recovery of the glutamic acid values therein. The glutamic acid-humin cake was repulped with purified glutamic acid filtrate from a previous cycle, and again filtered. The filtrate therefrom, ordinarily referred to as "crude glutamic acid repulp water," was reserved for addition to the alkaline hydrolyzate in a subsequent cycle.

*Glutamic acid purification.*—The glutamic acid-humin cake was slurried in a mixture of 500 parts of water and 83 parts of aqueous 50% sodium hydroxide solution, yielding a suspension of humin-like material in a solution of monosodium glutamate. To this suspension were added 20 parts of decolorizing carbon, and the mixture was heated at 60° C. for one-half hour, then filtered to separate the carbon-humin cake. The cake was washed with 200 parts of aqueous 10% sodium chloride solution and rejected. The carbon-humin filtrate was adjusted to pH 3.2 with 106 parts of 37% hydrochloric acid and allowed to stand overnight, during which time purified glutamic acid crystallized therefrom. The purified glutamic acid was filtered off, washed with 50 parts of water, and dried. The filtrate and wash water were combined and reserved to repulp crude GA-humin cake in a subsequent cycle.

*Material balance.*—The MSGE recovery and loss data are given in the table below. The quantities in the table have been adjusted for the slight difference between recycle streams into and out of the cycle described above.

| Stream or Component | Total Quantity, parts | MSGE Content | |
|---|---|---|---|
| | | Parts | Percent of input |
| CSF | 1,978 | 178.2 | |
| Recycle adjustment | | +3.7 | |
| Net input | | 181.9 | 100.0 |
| Glaserite | 202 | 3.3 | 1.8 |
| Tannin-humin | 66 | 0.6 | 0.3 |
| Inorganics | 218 | 1.1 | 0.6 |
| End liquor | 1,130 | 25.4 | 14.0 |
| Carbon-humin | 70 | 0.7 | 0.4 |
| GA | 123 | 146.7 | 80.6 |
| | | 177.8 | 97.7 |

While I have described my invention by specific reference to certain process details, it is to be understood that such details are illustrative only and not by way of limitation. Other modifications and equivalents of the invention will be apparent to those skilled in the art from the foregoing description.

In accordance with the present description, I claim as my invention:

1. In a co-neutralization process for recovering glutamic acid from a beet sugar waste liquor, the steps which comprise subjecting separate portions of said liquor to acid and alkaline hydrolysis, commingling alkaline hydrolyzate and unfiltered acid hydrolyzate in a proportion to give a pH between about 4 and about 6, separating insoluble material therefrom, concentrating the resulting liquid to a solids content between about 70 and about 90% by weight, crystallizing and separating inorganic salts therefrom, commingling the resulting liquid with a further quantity of unfiltered acid hydrolyzate sufficient to give a pH between about 2.5 and about 3.5, crystallizing from the resulting mixture a crude glutamic acid fraction containing humin substances, washing said crude glutamic acid fraction with a saline solution, commingling the washed crude glutamic acid fraction with water and an alkali-metal hydroxide in a sufficient proportion to dissolve the glutamic acid and to produce a pH between about 6 and about 8, separating humin substances from the resulting slurry, and recovering purified glutamic acid from the treated solution.

2. In a co-neutralization process for recovering glutamic acid from a beet sugar waste liquor, the steps which comprise subjecting separate portions of said liquor to acid and alkaline hydrolysis, commingling alkaline hydrolyzate and unfiltered acid hydrolyzate in a proportion to give a pH between about 4 and about 6, separating insoluble material therefrom, concentrating the resulting liquid to a solids content between about 70 and about 90% by weight, crystallizing and separating inorganic salts therefrom, commingling the resulting liquid with a further quantity of unfiltered acid hydrolyzate sufficient to give a pH between about 2.5 and about 3.5, crystallizing from the resulting mixture a crude glutamic acid fraction containing humin substances, washing said crude glutamic acid fraction with a saline solution, commingling the washed crude glutamic acid fraction with water and sodium hydroxide in a sufficient proportion to dissolve the glutamic acid and to produce a pH between about 6 and about 8, commingling the resulting solution with an activated carbon, separating said carbon together with humin substances and color bodies from the resulting slurry, acidifying the purified solution to about pH 3.2, and crystallizing purified glutamic acid therefrom.

3. A process for recovering glutamic acid from Steffen's filtrate which comprises hydrolyzing a portion of Steffen's filtrate by heating with hydrochloric acid at a pH of about 0 and a temperature of about 125° C. for about 2 hours and concentrating to a solids content of about 65% by weight, hydrolyzing another portion of Steffen's filtrate by heating with sodium hydroxide solution, commingling the alkaline hydrolyzate with a sufficient quantity of unfiltered acid hydrolyzate to give a pH between about 4.5 and about 5.5, separating insoluble material therefrom, concentrating the resulting liquid to a solids content of about 80% by weight, crystallizing and separating inorganic salts therefrom, adding to the resulting liquid a sufficient quantity of unfiltered acid hydrolyzate to give a pH of about 3.2 crystallizing from the resulting mixture a crude glutamic acid fraction containing humin substances, washing said fraction with a purified glutamic acid mother liquor, commingling the washed crude glutamic acid with water and adjusting the mixture to about pH 7 with sodium hydroxide, treating the resulting solution with an activated carbon in a proportion between about 0.1 and about 1 pound of carbon per pound of humin substances therein, removing from the solution a carbon cake containing said humin substances and color bodies, acidifying the purified solution to about pH 3.2, and crystallizing purified glutamic acid therefrom.

References Cited in the file of this patent

UNITED STATES PATENTS

| 2,487,739 | Stenehjem et al. | Nov. 8, 1949 |
| 2,525,902 | Hoglan et al. | Oct. 17, 1950 |
| 2,535,117 | Bennett | Dec. 26, 1950 |
| 2,788,368 | Purvis | Apr. 9, 1957 |